Figure 1:
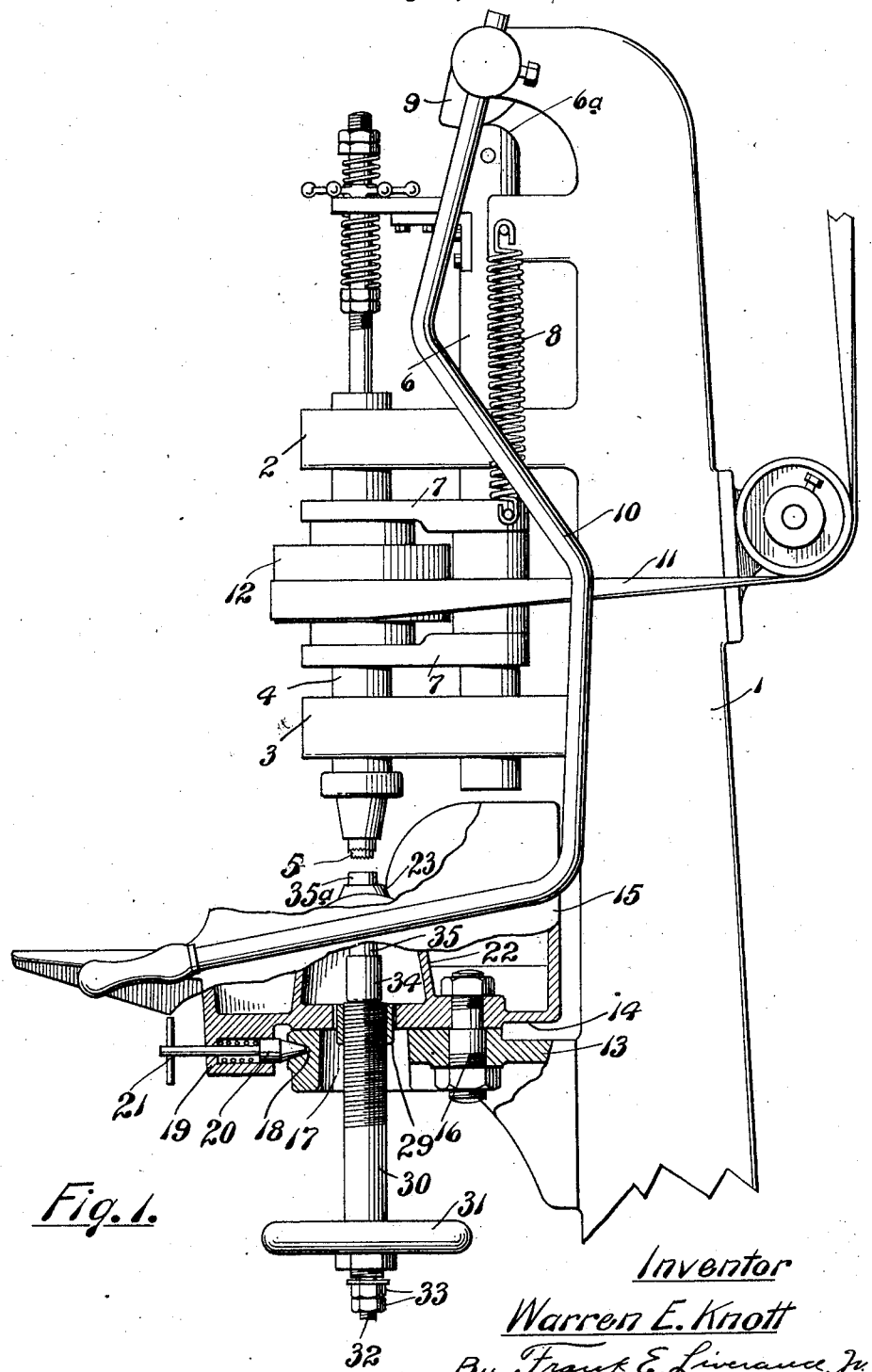

Jan. 29, 1929.　　　　　　　　　　　　　　　1,700,412
W. E. KNOTT
BUTTON BLANK CUTTING MACHINE
Filed Aug. 10, 1925　　　　2 Sheets-Sheet 1

Inventor
Warren E. Knott
By Frank E. Liverance, Jr.
Attorney

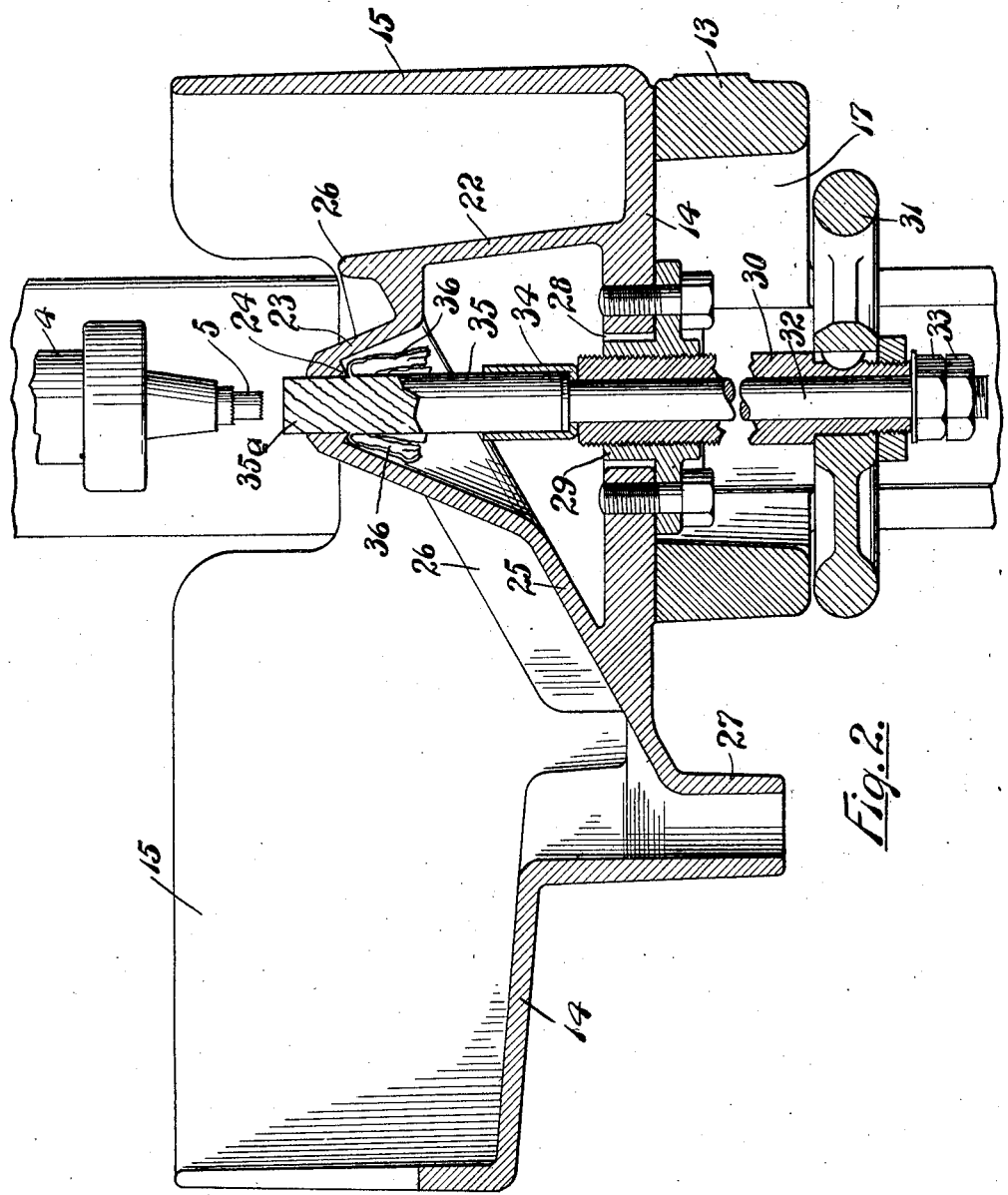

Patented Jan. 29, 1929.

1,700,412

UNITED STATES PATENT OFFICE.

WARREN E. KNOTT, OF GRAND RAPIDS, MICHIGAN, ASSIGNOR, BY MESNE ASSIGNMENTS, TO IMPROVED BUTTON CUTTING CORPORATION, OF DOVER, DELAWARE, A CORPORATION OF DELAWARE.

BUTTON-BLANK-CUTTING MACHINE.

Application filed August 10, 1925. Serial No. 49,169.

This invention relates to a button blank cutting machine and is particularly concerned with various improvements in the button blank cutting machine of the type shown by my earlier Patent No. 1,472,275, issued October 30, 1923. In button blank cutting machines of this character a tubular saw is mounted at the lower end of a rotating spindle the shell from which the blank is cut being placed against a wood supporting member directly underneath the saw, and the saw is then brought downward to engage with and cut through the shell making a circular blank, as fully described in said prior patent to which reference has been made.

The wood supporting blocks wear rapidly where the saw comes into contact therewith and it is necessary that, at its upper end, the block be dressed frequently so as to provide a suitable surface against which the shells may bear. The present invention has for one of its primary objects and purposes the provision of a novel means for supplying a relatively long cylindrical block support which is laterally supported at all sides both at its bottom and adjacent its upper end and which, as portions at the upper end are dressed away, may be moved upwardly the required distance to compensate for such material as is removed in dressing. This obviates the necessity of changing the supporting blocks frequently as one of the elongated cylindrical blocks of the type used with the present invention lasts a considerable time and may be frequently dressed and have portions cut away at its upper end before its entire length is exhausted. A further object of the invention is to provide a means whereby the upper end of the cylindrical block may be moved upwardly through a guide opening therefor and at all times fit very snugly against the sides of the opening, the cylindrical block in the first instance being made somewhat oversize for said opening and being automatically dressed and trimmed to size as it is forced upwardly therethrough, thus making the outer curved sides of the block conform exactly to and fit snugly in the opening through which the block passes. A yet further object of the invention is to provide, in a device of this character, a pan on which the block is mounted which is itself mounted to swing about a vertical axis so that the pan and the block carried thereby may be moved out of the way of the saw to permit changing when the saw becomes dull.

The construction by means of which these various ends stated, as well as many others not at this time particularly enumerated, are attained is described in the following description and shown in the accompanying drawings, in which, Fig. 1 is a fragmentary side elevation, with parts broken away and shown in section, showing the button blank cutting machine equipped with my invention, and Fig. 2 is an enlarged vertical section taken through the pan and the block mount associated therewith, the plane of the section being in front of and parallel to the face of the column or post on which the mechanism is mounted.

Like reference characters refer to like parts in the two figures of the drawings.

In the construction of the machine a vertical supporting post or column 1 is provided from which upper and lower arms 2 and 3 extend forwardly through which a spindle 4 passes vertically, it being mounted for rotation and carrying a saw 5 at the lower end. Back of the spindle 4 a bar 6 is slidably mounted from which two arms 7 extend forwardly one above and the other below an intermediate enlargement of the spindle 4. The bar 6 is normally held in upper position by coiled springs 8 but may be moved downwardly on operation of a cam 9 which engages with the rounded upper end $6^a$ of the bar 6 and is operated to turn about a horizontal axis by an operating handle 10 thereby moving the bar 6 downwardly, carrying the spindle and saw with it in its downward movement. The spindle is driven by a belt 11 passing around a pulley 12 mounted on said spindle. This construction is not fully described in detail as, in all essential particulars, it is similar to the construction of button blank cutting machine shown in my earlier patent above noted.

A bracket 13 is rigidly connected to the front side of the column 1 a distance below the mechanism just described, on which a pan is mounted having a bottom 14 and upstanding sides 15. The pan is pivotally mounted on a bolt 16 to turn about a vertical axis, said bolt passing through the bracket 13 and the bottom 14 of the pan. The bracket 13 in front of the pivot is provided with a relatively large vertical opening 17 and at its outer end beyond said opening 17 has a horizontally located conical recess 18. The pan at its front side and below its bottom is formed with a downwardly extending boss 19 bored inwardly from its inner side to provide a recess in which a locking element 20 may be received the same being normally spring actuated so that when free to do so it will pass into the recess 18 in the bracket 13. The element 20 has a rod extending therefrom through the boss 19 equipped with a handle 21 at its outer end for manually moving the element 20 out of locking position, whereupon the pan may be swung around so that it is out of the way of the saw 5 which may be then readily removed for changing when it becomes dull.

The pan described is made of cast iron preferably and over the opening 17 in the bracket 13 is formed with an upstanding hollow projection 22 which, at its upper side, terminates in an upwardly extending projection 23 of smaller size provided with a vertical guide opening in its upper side directly below the saw 5 when the pan is in operative position. The lower edges around said opening are formed at an acute angle by under-cutting the metal adjacent the same so that such edges provide a cutting edge for removing excess of wood from the wood blocks formed therethrough as will hereafter appear. The upwardly extending projection 22 at its outer side is downwardly inclined to make the bottom 25 of a chute which is completed by vertical sides 26 spaced apart and curved around the smaller upwardly projecting part 23 described. The button blanks and the water which is used with such machines to keep the saw cool ride down this chute and are discharged through the outlet 27 into a convenient receptacle.

In the bottom 14 directly below the opening in the part 23 a vertical opening 28 is made in which an interiorly threaded sleeve 29 is mounted, being permanently secured to the bottom 14 of the pan by set screws, as shown in Fig. 2. An elongated rod 30 threaded at its upper end portion passes through the sleeve. The rod 30 at its lower end is equipped with a hand wheel 31 keyed thereto. Said rod 30 is also bored for its entire length to make a central vertical opening therethrough for the passage of a smaller rod 32 which is equipped with locking nuts 33 at its lower end and has a thin head at its upper end fitting into the lower end of a cup 34 of sheet metal, the rod 32 passing through the bottom of the cup. In this manner the cup is secured at the upper end of the rod or sleeve 30, and the entire assembly consisting of sleeve 30, rod 32, hand wheel 31, nuts 33 and cup 34 may be removed by unscrewing the sleeve 30 in the proper direction.

When thus removed an elongated cylindrical block 35 of wood may be inserted at one end into the open end of the cup 34 and the assembly replaced, whereupon the upper end of the block 35 will come directly to the lower end of the opening through the part 23. These cylindrical wood blocks are slightly larger in diameter than the diameter of said opening and when forced upwardly through said opening the excess of material is shaved from the block and the portion of the block 35$^a$ passing through the opening fits very snugly against the sides of the opening, as is apparent. Only a small portion of the block projects above the member 23 and it is evident that the block is firmly supported and cannot vibrate or change position in any manner.

With the operation of the machine and the sawing of the button blanks from shells, the upper end of the block 35 is acted upon more or less by the saw when it passes through the shell and in relatively short time becomes unfit to further support the shells, whereupon the damaged upper end portion of the block must be cut away. This can be done very quickly and easily and the block then forced upwardly so that it is positioned with relation to the saw 5 the same as it was before the dressing operation took place. This operation may be repeated until the upper end of the cup 34 comes against the guide part 23. When this occurs it is time to use a new block and the assembly mentioned is removed, the residue of the old block taken from the cup 34 and replaced by a new and longer cylindrical block.

This construction is very useful and effective for the purposes for which it is designed. Not only is there provided an absolutely secure support for the woden blocks which obviates any lateral motion thereof, but it is not necessary to make the blocks to any extreme nicety in size in order to have such positive lateral bearing against the sides thereof as is necessary to eliminate all vibration and lateral movement of the supporting block. This is effected by a very simple construction, but one which in practice has proved highly efficient. Various changes in detail of construction may be resorted to without departing from the invention defined in the appended claims and the invention is to be considered as comprehensive of all such changes or modifications that may be made which come within the scope of said claims.

I claim:

1. In a machine of the class described, a vertical support, button blank cutting mechanism located vertically in front of the support, means for mounting said mechanism for up and down movements, said mechanism including a blank cutting saw at its lower end, an elongated cylindrical block located directly below the lower end of the saw, a vertically movable device in which the lower end of the block is inserted, a guide having an opening through which the upper end of the block passes, said opening being slightly less in diameter than the diameter of the block, and a cutting edge on the guide surrounding said opening whereby as said vertically movable means carrying the lower end of the block is moved upwardly excess of material at the sides of the upper portion of the block is removed therefrom and the block automatically fitted tightly to said guide.

2. In a machine of the character described, a vertical support, button blank cutting mechanism mounted vertically in front of the support, said mechanism including a blank cutting saw at its lower end, means for movably mounting said mechanism for up and down movements, manually operable means for moving said mechanism in a downward direction, a cylindrical block of wood or like material located below the saw, a guide having a cylindrical opening smaller than the diameter of said block through which the upper end of the block passes, a cutting edge on said guide surrounding said opening, a cup by which the lower end of the block is gripped, and a screw on which said cup is mounted, said screw being vertically adjustable.

3. In a machine of the character described, a guide having an opening therethrough, a cutting edge on the guide surrounding the opening, a block slightly larger than the opening, screw means detachably connected to said guide for forcing the block past the cutting edge and through the opening and means for attaching the block to the screw means.

4. In a machine of the character described, a cutting tool, a cylindrical block adapted to support the work for said cutting tool, a guide having an opening smaller in diameter than said block, a cutting edge on the guide surrounding said opening, and means to force the block past said cutting edge and through said opening and to hold it in operative position relative to said cutting tool.

In testimony whereof I affix my signature.

WARREN E. KNOTT.